April 21, 1964

H. M. WENGER 3,129,739

PORTABLE HAY SHREDDING MACHINE FOR
BEDDING COWS OR THE LIKE

Filed Jan. 9, 1961

H. M. WENGER 3,129,739

PORTABLE HAY SHREDDING MACHINE FOR
BEDDING COWS OR THE LIKE

Filed Jan. 9, 1961

United States Patent Office 3,129,739
Patented Apr. 21, 1964

3,129,739
PORTABLE HAY SHREDDING MACHINE FOR BEDDING COWS OR THE LIKE
Harvey M. Wenger, Terre Hill, Pa., assignor to Farmers National Bank and Trust Company, New Holland, Pa., a national banking corporation
Filed Jan. 9, 1961, Ser. No. 81,345
4 Claims. (Cl. 146—70.1)

This invention relates to a portable hay shredding machine or the like and has for an object the provision of an improved portable machine for shredding baled hay and discharging it along a predetermined path such as in stalls along a walkway for bedding cows or the like.

In bedding cows, it is customary for the farmer to take one or more bales of hay, place them on the walkway between the cow stalls and break them up with a pitchfork and then throw the loosened hay into the cow stalls to provide a bed for the cows. It is customary to bed the cows down every morning and evening and, depending upon the number of cows invloved, this operation becomes quite time-consuming. The operation is particularly difficult and time-consuming if the baled hay is particularly hard, such as being partially frozen, as is frequently the case in the winter.

The present invention provides a portable hay shredding machine which is adapted to be pushed by an operator and is particularly suited for bedding cows in a minimum amount of time and with minimum effort by the farmer or operator. The operator pushes the bedding machine down the walkway of a cattle barn and the stalls for the cows are on opposite sides of the walkway. A bale of hay will bed about ten cattle and the cow bedding machine, constructed in accordance with the present invention, is adapted to shred up a bale of hay or straw in about one minute and concurrently throw the straw or hay over the trough along the side of the walkway into the cow stalls as the machine is moved along the walkway.

In accordance with the present invention there is provided a portable hay shredding machine adapted for shredding baled hay or the like and discharging it along a predetermined path such as in stalls along the walkway for bedding cows or the like. Such machine is provided with a main frame which in turn is supported on wheels for movement along the predetermined path. The main frame is provided with a support for a bale of hay and cutter means is supported by the main frame adjacent the supporting means for the bale of hay. Means is provided for moving the leading end of the bale of hay into engagement with the cutter means which is adapted for actuation. The cutter means is disposed to move across the leading end of the bale of hay to transform the hay from a packed, baled condition into a loose condition. A housing surrounds the cutter means and is provided with an entrance for receiving the bale of hay and a discharge opening spaced therefrom. Rotatable fan means is supported by the main frame within the housing and positioned with respect to the discharge opening for blowing the hay loosened from the bale through the discharge opening along the predetermined path.

For further objects and advantages thereof and for more detailed disclosure, reference is to be had to the following description taken in conjunction with the accompanying drawings in which:

FIG. 3 is a horizontal sectional view taken along the lines 3—3 in FIG. 2; and

FIG. 4 is a vertical, sectional view taken along the lines 4—4 in FIG. 3.

Figure 1:
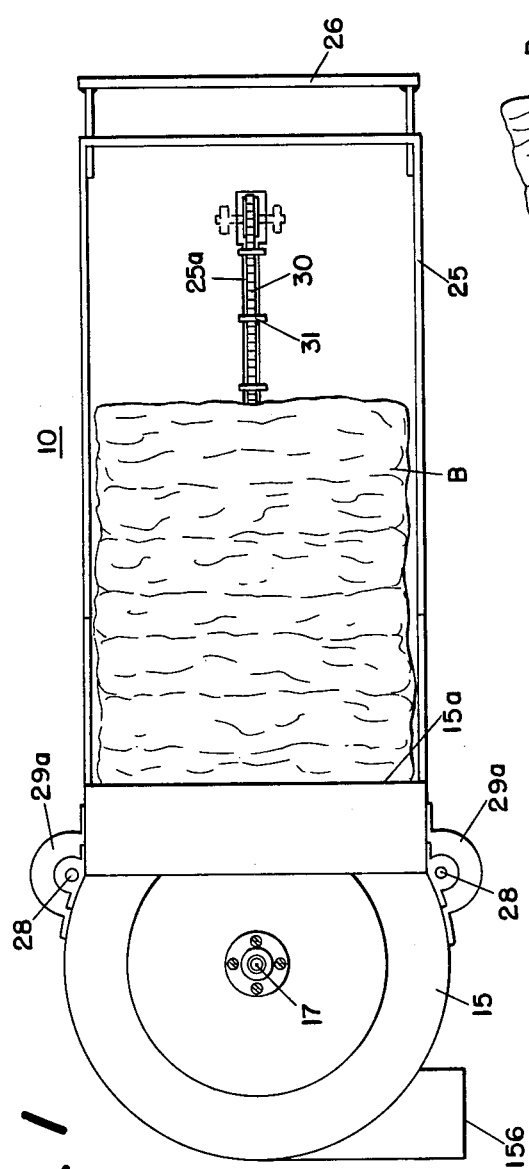
FIG. 1 is a top plan view of a machine embodying the present invention.

Referring to the drawings, there is illustrated a portable hay shredding machine 10 which is particularly suited for bedding cows or the like where it is necessary to break up a bale of hay or straw into loose material so that it may be discharged in loose condition into predetermined positions such as cow stalls or the like. The machine 10 is provided with a main frame 11, FIGS. 2 and 4, which is supported by a pair of wheels 12 at the rear of the frame 11 and a single swivel caster wheel 13 at the front end of the machine. Supported on the frame 11 is a housing 15 which is adapted to enclose a tubular shredder drum 16. The shredder drum 16 preferably is conical in shape and tapers from a larger diameter at the bottom to a smaller diameter at the top. The drum 16 is disposed vertically within the housing 15 and is carried by a vertical shaft 17 which is journalled at its lower end in the main frame 11 and at its upper end in the top of housing 15. The outer surface of the shredder drum 16 is provided with a plurality of projecting knives or cutters 20 which extend horizontally from the drum 16 and are disposed in a staggered or spiral location on the surface of the drum 16. The lower end of the drum 16 is provided with a plurality of radially extending paddles or blades 23 which act as a fan as the drum 16 rotates. The purpose of the paddles 23 will later be described.

Figure 2:
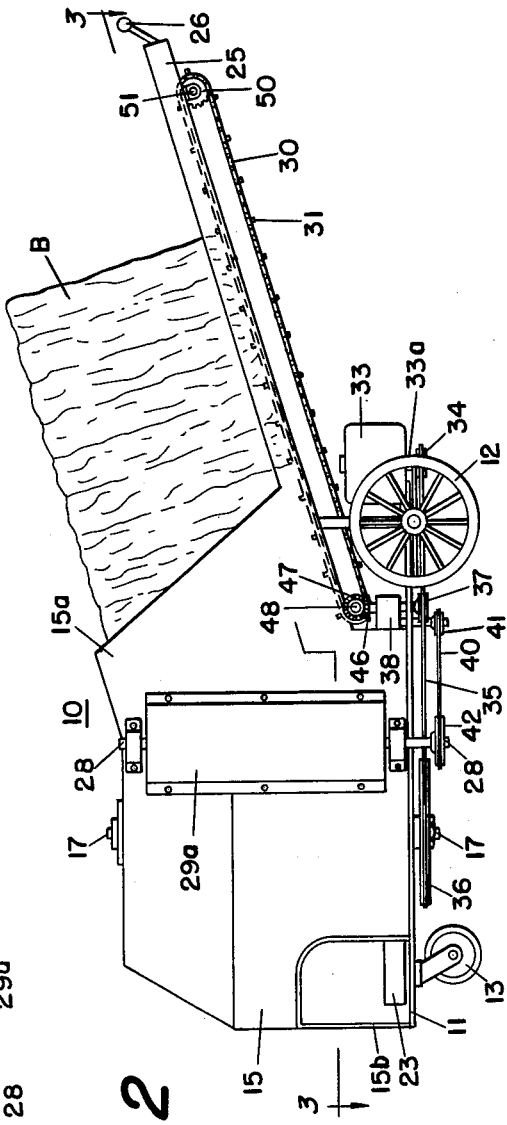
FIG. 2 is a front elevational view of the machine illustrated in FIG. 1.

At the rear of the frame 11 and supported thereon is a platform 25 which is adapted to support a bale of hay with the leading end thereof adjacent the drum 16. The platform 25 is inclined downwardly so that its lower end terminates just above the fan or blower paddles 23. The housing 15 is provided with an entrance 15a into which the bale of hay B extends while supported on the platform 25, as shown in FIGS. 1 and 2. The outer end of the supporting platform 25 is provided with a handle 26 which the operator uses to position the machine 10 as it moves along on the wheels 12 and 13. The platform 25 is inclined toward the horizontal and forms an angle which is approximately 90° with respect to the surface of the drum 16. The shredder knives 20 are adapted to move across the face of the leading end of the bale B and by reason of their staggered position on the drum 16, the knives 20 engages different locations of the bale and cause the hay to be shredded into a loose condition.

On either side of the housing 15 and adjacent the entrance thereof there is provided a pair of vertical shafts 28 on which are mounted feeder spikes 29 which are adapted to engage the leading end of the bale at opposite sides and assist in moving the bale of hay into the housing 15 and into contact with the cutters or shredders 20 on the shredder drum 16. It will be noted that the feeder spikes 29 are curved for ease in guiding the bale into contact with the cutters 20 on the drum 16. To assist the feeder spikes 29 in moving the bale, the platform 25 is provided with a conveyor chain 30 which in turn is provided with cleats 31 which are adapted to engage the bottom of the bale as shown in FIG. 2. The conveyor chain 30 and cleats 31 also serve to assist gravity in sliding a bale down the incline of platform 25 to move the bale into engagement with the feeder spikes 29 before the latter take over to move the bale into the housing 15.

The drum 16, the feeder spikes 29 and the conveyor chain 30 are all adapted to be power-driven. The source of power is illustrated as a motor 33 which is provided with a shaft extension 33a on which is mounted a drive pulley 34. The pulley 34 receives a chain or belt 35 which also extends around a pulley wheel 36 carried by the lower end of the vertical shaft 17 which supports the drum 16. The belt 35 also passes over a pulley 37 carried by an input shaft which connects with a gear box 38 including suitable reduction gears for providing low speed rotation of the feeder spikes 29 by way of a feeder drive belt 40. The feeder drive belt 40 passes over a pulley 41 on the low speed output shaft from the gear box 38 and around pulley wheels 42 and 43 located at the lower ends of shafts 28 for the feeder spikes 29.

As may be seen in FIGS. 2 and 3, the feeder drive belt 40 is adapted to extend around a pulley 44 to the lower end of a vertical shaft 45 having at its upper end a bevel gear 46. The bevel gear 46 meshes with a corresponding bevel gear 47, FIG. 2, which is carried at one end of a horizontal shaft 48 which carries one of the sprocket wheels 49 around which the conveyor chain 30 passes. The other sprocket wheel 50 for conveyor chain 30 is carried by a shaft 51 supported adjacent the handle end of the platform 25, FIG. 4. A feeder drive belt tightener 53, FIG. 3, is positioned adjacent the pulley 44 and engages the drive belt 40. Thus it will be seen that the conveyor chain 30 as well as the feeder spikes 29 are driven at reduced speed by way of the feeder drive belt 40. The platform 25 is provided with a slot 25a through which the conveyor chain 30 extends and the cleats 31 have sufficient length as shown in FIG. 3 to be supported on the upper surface of the conveyor 25.

In operation of the portable hay shredding machine 10 a bale of hay B is placed on the inclined platform 25 and is moved towards the entrance 15a of housing 15. This movement is accomplished by the combined effect of gravity and the forward movement of the conveyor 30. When the leading end of the bale B moves into engagement with the feeder spikes 29, they will control the forward movement of the bale towards the shredder drum 16. The feeder spikes 29 move at a substantially slower speed than the shredder drum 16. For example, the shredder drum 16 rotates in the order of 250 r.p.m. whereas the feeder spikes 29 rotate in the order of 2 r.p.m. This difference in speed results from the gear reduction unit 38 although the drive for both the shredder drum 16 and the feeder spikes 29, as well as conveyor chain 30 is derived from the common power source of motor 33. The motor 33 may be of any sutiable type such for example as an electric motor and it has been found that a motor having a capacity in the order of 1 H.P. is adequate to drive the various parts of the apparatus 10. When the knives 20 on the shredder drum 16 engage the bale of hay B, the hay is shredded and the shredded material passes around the drum 16 within the housing 15 and is discharged or blown through a discharge opening 15b by the air blast created by the blower paddles 23 carried by the lower end of the shredder drum 16. The feeder spikes 29, due to their slow rotation insure a steady inward feed of the bale and prevent the drum 16 from receiving too large quantities of hay, such as are entered when end sections of the bale are moved against the knives or shredders 20 when moved against the drum 16.

The machine 10 is adapted to handle conventional size bales which are about 16″ x 18″ x 42″ as well as barn size bales which are somewhat larger in the order of 17″ x 19″ x 48″. The opening 15a to the blower housing 15 is in the order of 20 inches square. The platform 25 is about five feet long and thus easily accommodates the bales of hay or straw which are between 42″ and 48″ in length. The shredder drum 16 in one embodiment had a height of about 36″ and tapered from a diameter of approximately 24″ at the bottom to about 6″ at the top. The knives 20 were disposed in a staggered or spiral location extending around the surface at approximately six equally-spaced locations. The feeder spikes 29 which rotated about 2 r.p.m. had a diameter of about 8″ so that they would feed about 48″ of bale per minute. Thus the machine was capable of shredding a bale of straw or hay in about one minute.

The present invention is particularly suited for shredding straw or hay for use in bedding cattle. One bale will bed about ten cattle. The operator pushes the bedding machine down the walkway of a cattle barn and the stalls for the cows are on the opposite sides of the walkway. The machine throws the straw about 6′ to 8′ and thus throws it over the trough which is normally along each side of the walkway. It is not necessary to remove the cows from the stalls during this bedding operation as the straw will be thrown in around the legs of the cows without disturbing them. As the machine 10 is relatively of light weight, say in the order of two-hundred fifty pounds, it can be easily transported to different locations. The machine is not confined to use as a cow bedding machine but has other suitable applications where shredded straw is desired, such for example as in mulching strawberries. The hay shredding machine 10 not only shreds the hay from a baled condition to a shredded condition, but by reason of the fact that the machine is portable and includes a blower, the shredded hay can be readily directed to the desired location without additional handling of the hay on the part of the operator.

While the term hay has been used in the specification and claims, it is to be understood that this term is used in a generic sense and is intended to include other baled products.

While a preferred embodiment of the invention has been described and illustrated, it is to be understood that further modifications thereof may be made within the scope of the appended claims.

What is claimed is:

1. A portable hay shredding machine comprising a main frame, wheel means supporting said main frame for movement thereof, a conical shredder drum supported by said main frame for rotation about a vertical axis, said conical shredder drum tapering from a larger diameter at the lower end thereof to a smaller diameter at the top, a plurality of cutters carried by said drum and projecting from the surface thereof at predetermined locations, platform means carried by said main frame and inclined downwardly towards said conical shredder drum for supporting a bale of hay with the leading end thereof adjacent said conical shredder drum for contact with said cutters, means for rotating said conical shredder drum to move said cutters across the leading end of the bale of hay to transform the hay from a packed, baled condition to a loose condition, a housing surrounding said cutter means, said housing having an entrance for receiving a leading end of the bale of hay and a discharge opening spaced therefrom, and fan means carried by said conical shredder drum at the lower end thereof and positioned with respect to said discharge opening for blowing the hay loosened from the bale through said discharge opening.

2. A portable hay shredding machine according to claim 1 including means for moving the leading end of the bale of hay into engagement with the cutters of said drum.

3. A portable hay shredding machine according to claim 2 wherein said means for moving the leading end of the bale of hay into engagement with the cutters of said drum comprises driven feeder means disposed on at least one side of said support for the bale, said feeder means having a plurality of projections adapted to engage a side of the bale and feed it towards said drum.

4. A portable hay shredding machine according to claim 3 including motor means for rotating both said drum and said feeder means, said drum being rotated at a substantially faster speed than said feeder means.

References Cited in the file of this patent

UNITED STATES PATENTS

| | | |
|---|---|---|
| 271,399 | Baker | Jan. 30, 1883 |
| 2,345,779 | Wagner | Apr. 4, 1944 |
| 2,416,432 | Brady | Feb. 25, 1947 |
| 2,435,030 | Brady | Jan. 27, 1948 |
| 2,681,090 | Hicks et al. | June 15, 1954 |
| 2,685,900 | Cross | Aug. 10, 1954 |
| 2,889,862 | Williamson | June 9, 1959 |
| 3,035,621 | Burcham | May 22, 1962 |